United States Patent

Smith, III

[11] Patent Number: 5,829,480
[45] Date of Patent: Nov. 3, 1998

[54] LOCKING DEVICE FOR UNDERSEA HYDRAULIC COUPLING

[75] Inventor: Robert E. Smith, III, Missouri City, Tex.

[73] Assignee: National Coupling Company, Inc., Stafford, Tex.

[21] Appl. No.: 852,435

[22] Filed: May 7, 1997

[51] Int. Cl.⁶ .................................................. F17D 65/20
[52] U.S. Cl. ...................... 137/614.04; 137/614; 285/317
[58] Field of Search .................................. 285/317, 108; 137/614.04, 614; 251/149.6

[56] References Cited

U.S. PATENT DOCUMENTS

| | | | |
|---|---|---|---|
| 167,675 | 9/1875 | Koehler | 285/317 |
| 755,325 | 3/1904 | Soutar | 285/317 |
| 1,098,265 | 5/1914 | James | 285/317 |
| 1,913,982 | 6/1933 | Fox . | |
| 2,129,704 | 9/1938 | Meyer | 284/19 |
| 2,218,318 | 10/1940 | Pfauser | 284/19 |
| 2,431,268 | 11/1947 | McIntyre | 285/317 |
| 2,457,251 | 12/1948 | Main, Jr. | 284/19 |
| 2,727,759 | 12/1955 | Elliott | 284/18 |
| 2,727,761 | 12/1955 | Elliott et al. | 285/168 |
| 2,735,696 | 2/1956 | Omon et al. | 284/19 |
| 2,757,684 | 8/1956 | Ulrich | 137/515 |
| 2,776,850 | 1/1957 | Hawk | 284/17 |
| 2,966,371 | 12/1960 | Bruning | 284/19 |
| 3,201,151 | 8/1965 | Westveer | 285/73 |
| 3,217,746 | 11/1965 | Voisine | 137/614.04 |
| 3,527,480 | 9/1970 | Larson | 285/85 |
| 3,550,624 | 12/1970 | Johnson | 137/614 |
| 3,551,005 | 12/1970 | Brun | 285/10 |
| 3,625,251 | 12/1971 | Nelson | 137/614.04 |
| 3,700,112 | 10/1972 | Maeshiba | 285/317 |
| 3,730,221 | 5/1973 | Vik | 137/614 |
| 3,796,448 | 3/1974 | Ringkamp | 285/317 |
| 3,918,485 | 11/1975 | Weber et al. | 137/594 |
| 4,086,939 | 5/1978 | Wilcox et al. | 137/614.03 |
| 4,089,549 | 5/1978 | Vyse et al. | 285/137 |
| 4,124,228 | 11/1978 | Morrion | 285/1 |
| 4,222,411 | 9/1980 | Herzan et al. | 137/614.04 |
| 4,253,683 | 3/1981 | Jentsch et al. | 285/13 |
| 4,426,104 | 1/1984 | Hazelrigg | 285/26 |
| 4,453,566 | 6/1984 | Henderson, Jr. et al. | 137/614.02 |
| 4,460,156 | 7/1984 | Hazelrigg et al. | 251/149.3 |
| 4,552,333 | 11/1985 | Niemi | 251/149.9 |
| 4,582,347 | 4/1986 | Wilcox et al. | 285/12 |
| 4,637,470 | 1/1987 | Weathers et al. | 166/344 |
| 4,694,859 | 9/1987 | Smith, III | 137/614.04 |
| 4,709,726 | 12/1987 | Fitzgibbons | 137/614.04 |
| 4,721,132 | 1/1988 | Houlgrave | 137/614.6 |
| 4,745,948 | 5/1988 | Wilcox et al. | 137/614.05 |
| 4,754,780 | 7/1988 | Smith, III | 137/614.04 |
| 4,813,454 | 3/1989 | Smith, III | 137/614.04 |
| 4,817,668 | 4/1989 | Smith, III | 137/614.04 |
| 4,832,080 | 5/1989 | Smith, III | 137/614.04 |
| 4,834,139 | 5/1989 | Fitzgibbons | 137/614.04 |
| 4,858,648 | 8/1989 | Smith, III et al. | 137/614.04 |
| 4,884,584 | 12/1989 | Smith | 137/614.04 |

(List continued on next page.)

FOREIGN PATENT DOCUMENTS

| | | | |
|---|---|---|---|
| 1014510 | 12/1965 | United Kingdom | 285/317 |
| 1319743 | 6/1973 | United Kingdom | 285/317 |
| 2 097 885 | 11/1982 | United Kingdom | F16L 39/00 |
| 2 121 502 | 12/1983 | United Kingdom | F16L 17/06 |
| 2 132 728 | 7/1984 | United Kingdom | F16L 39/00 |
| 2 190 969 | 12/1987 | United Kingdom | F16L 21/02 |
| 2 195 158 | 3/1988 | United Kingdom | F16L 29/00 |

*Primary Examiner*—Denise L. Ferensic
*Assistant Examiner*—John Ball
*Attorney, Agent, or Firm*—Arnold, White & Durkee

[57] ABSTRACT

An apparatus for locking together male and female coupling members for use in undersea production and drilling applications is disclosed. A lock pin engages a circumferential groove around the body of the female coupling member. The lock pin may be released to allow partial separation of the male and female coupling members while the valves of each coupling member are closed, allowing the coupling members to remain connected subsea while the flow of hydraulic fluid is shut off.

11 Claims, 4 Drawing Sheets

U.S. PATENT DOCUMENTS

| | | | |
|---|---|---|---|
| 4,900,071 | 2/1990 | Smith, III | 285/379 |
| 4,915,419 | 4/1990 | Smith, III | 285/26 |
| 4,924,909 | 5/1990 | Wilcox | 137/614.05 |
| 5,015,016 | 5/1991 | Smith, III | 285/108 |
| 5,029,613 | 7/1991 | Smith | 137/614.04 |
| 5,033,777 | 7/1991 | Blenkush | 285/317 |
| 5,052,439 | 10/1991 | Smith, III | 137/614.04 |
| 5,063,965 | 11/1991 | Wilcox | 137/614.03 |
| 5,072,755 | 12/1991 | Wilcox | 137/614.03 |
| 5,099,882 | 3/1992 | Smith, III | 137/614.04 |
| 5,203,374 | 4/1993 | Smith, III | 137/614.04 |
| 5,232,021 | 8/1993 | Smith | 137/614.04 |
| 5,277,225 | 1/1994 | Smith | 137/614.04 |
| 5,323,812 | 6/1994 | Wayne | 137/614.05 |
| 5,325,890 | 7/1994 | Wilkins | 137/614.03 |
| 5,339,861 | 8/1994 | Smith, III | 137/614.04 |
| 5,342,098 | 8/1994 | Wilkins | 285/26 |
| 5,355,909 | 10/1994 | Smith, III | 137/614.04 |
| 5,365,972 | 11/1994 | Smith, III | 137/614.04 |
| 5,390,702 | 2/1995 | Smith, III | 137/614.04 |
| 5,406,980 | 4/1995 | Allread et al. | 137/614.03 |
| 5,494,073 | 2/1996 | Saito | 137/614.03 |

LOCKING DEVICE FOR UNDERSEA HYDRAULIC COUPLING

BACKGROUND OF THE INVENTION

1. Field of the Invention

The present invention relates to hydraulic couplings used in undersea drilling and production applications. More particularly, the invention involves a locking mechanism for restraining axial movement of male and female coupling members used in undersea applications.

2. Description of the Related Art

Subsea hydraulic couplings are old in the art. Subsea hydraulic couplings are shown, for example, in U.S. Pat. No. 4,694,859 to Robert E. Smith III, and other patents assigned to National Coupling Company, Inc. of Stafford, Tex. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitate connections to hydraulic lines, while the large bore seals and slidingly engages the male member of the coupling.

The male member includes a cylindrical body having an outer diameter approximately equal to the diameter of the large female bore, and a connection at its other end for hydraulic lines. When the cylindrical body of the male member is inserted into the large bore of the female member, according to various embodiments of the device, fluid flow is established between the male and female members.

The male member and female member are generally connected to opposing junction plates of a manifold and are held together by bolts or hydraulic members attached to the plate. The male member is commonly attached to one junction or manifold plate, while the female member is attached to an opposing plate so as to face the male member and align with it. The male and female members may be attached to the junction or manifold plates using various means such as set screws or threads.

Typically, several subsea hydraulic couplings are grouped together on each junction or manifold plate. For example, between 10 and 30 coupling members may be attached to each opposing plate. In the subsea environment, a diver may be required to connect the opposing plates together, and thereby connect the opposing coupling members on the plates. The coupling members are simultaneously connected and the opposing plates are locked together. U.S. Pat. No. 4,915,419 to Robert E. Smith III, assigned to National Coupling Company, Inc. of Stafford, Tex. discloses a sliding lock plate used for connecting together subsea hydraulic couplings.

Attempts have been made in the past to eliminate or reduce the problems due to high separational forces of the couplings by individually locking together the male and female members in each coupling. In the subsea environment, however, individually connecting each of the hydraulic coupling members together has been a difficult undertaking.

A proposed solution is the use of lock sleeves for subsea hydraulic couplings. The lock sleeve is pulled back axially to release balls inside the female coupling member. After the male member has entered and seated in the female member, the lock sleeve is released, allowing the balls to reposition in the female and lock the male member and female member together. However, the lock sleeve has a number of disadvantages. It is relatively heavy and bulky, which is undesirable in the subsea environment. Additionally, the lock sleeve requires substantial vertical clearance sufficient to allow for the longitudinal movement necessary for connection or disconnection. Other problems are caused by a build up of silt, ocean debris and marine growth in the lock sleeve. The build up may result in jamming the lock sleeves and especially the locking balls. The couplings require high longitudinal thrust and cannot be disconnected without great difficulty after a period of time subsea.

A reliable solution is needed for locking together subsea couplings that can be easily handled in the subsea environment. Additionally, in undersea drilling and production applications at increasingly greater depths, it is desirable to connect and/or disconnect the coupling members with robotics or other diverless apparatus. A simple mechanism for connecting and locking together subsea hydraulic coupling members is needed that can be operated without a diver.

It also is desirable to discontinue flow of hydraulic fluid in the coupling by closing the valves in the male and female coupling members, without disconnecting and retrieving one set of members (i.e. the female coupling members). For example, because of adverse weather conditions, strong currents and potential damage to the hydraulic system, it is necessary to shut off the flow of hydraulic fluid to prevent leakage and ensuing damage to the subsea environment. Rather than retrieve the female coupling members while the male coupling members remain subsea, a reliable solution is needed for temporarily "parking" the female coupling members subsea while the valves in the coupling remain closed.

SUMMARY OF THE INVENTION

The present invention overcomes the above mentioned problems and disadvantages by providing a locking mechanism for undersea hydraulic couplings that is simple to operate and can be used by diverless systems or robotics at remote subsea locations. The locking mechanism includes a lock pin which engages a groove around the body of the opposing coupling member. The lock pin is on an axis perpendicular to the coupling axis. The female member is inserted into a sleeve extending from the male member, and the lock pin engages the groove in the female member. A two stage locking mechanism can be incorporated by including a second groove around the circumference of the female member. As the female member is partially separated from the male member, the lock pin catches the second groove which prevents the coupling members from being further separated. At the position corresponding to the second groove, the poppet valves in both the male and female members are closed, thus stopping high separational forces. The female member of the coupling now can be temporarily "parked" and later safely reconnected or disconnected completely.

The advantages of the present invention include its simplicity, high reliability, and light weight. Another advantage of the present invention is that it is less bulky than the prior art. The present invention requires significantly less manual manipulation than the prior art lock sleeves. Another advantage of the present invention is that it will not tend to jam up with silt, ocean debris and marine growth during use.

DETAILED DESCRIPTION OF A PREFERRED EMBODIMENT

Figure 1:
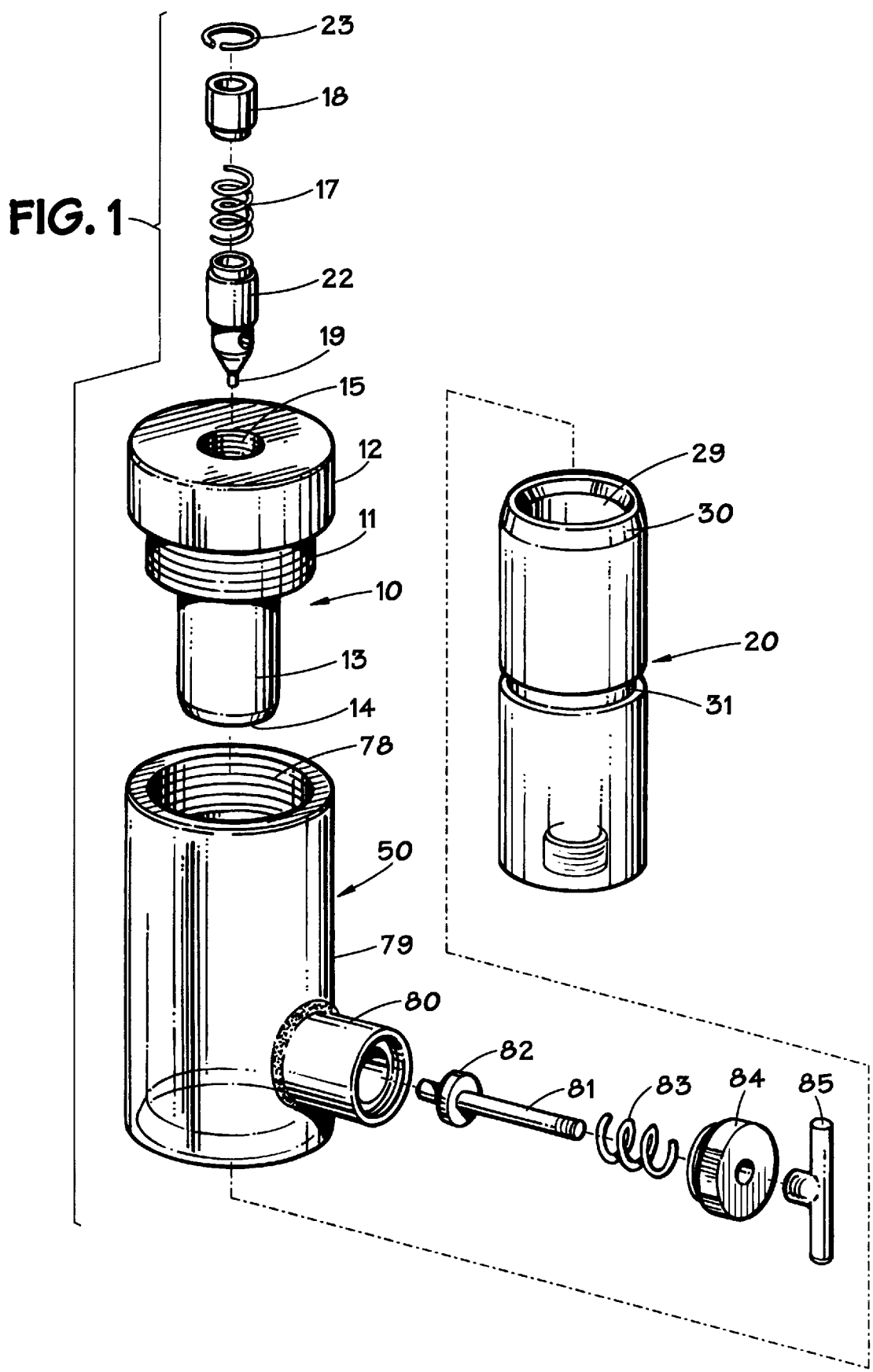
FIG. 1 is an exploded perspective view of the male and female coupling members and locking mechanism according to the present invention.

FIG. 1 is an exploded perspective view of a male coupling member (10) and a female coupling member (20) according to a preferred embodiment of the present invention. The male coupling member (10) has an internal bore (15) extending therethrough and a poppet valve (22) inserted therein for controlling the flow of hydraulic fluid through the bore. Poppet valve (22) is urged into the normally closed position by poppet valve spring (17) which is held in the bore by spring collar (18) and lock ring (23). The male member has a flange (12) at one end thereof and a threaded section (11) having a smaller diameter than flange (12). Adjacent to threaded section (11) is probe wall (13) which terminates at leading face (14).

Sleeve member (50) is internally threaded for releasably engaging threads (11) in the male member. Sleeve member (50) has a bore (78) extending therethrough. The sleeve body (79) has a generally cylindrical shape. Housing (80) is attached to the sleeve body for inserting lock pin (81) therein. The lock pin (81) has a flange (82) adjacent a first end thereof for abutting spring (83). The lock pin has a handle (85) at the second end thereof and is urged by the spring through aperture into the bore (78) of sleeve (50). The housing also includes enclosure (84).

The sleeve is dimensioned to fit around the outside of female member (20) which is a cylindrical body having a longitudinal bore (29) dimensioned to receive probe (13). Intermediate the female member (20) is a circumferential groove (31) which is dimensioned so that lock pin (81) will fit therein when the coupling members are fully engaged.

Figure 2:
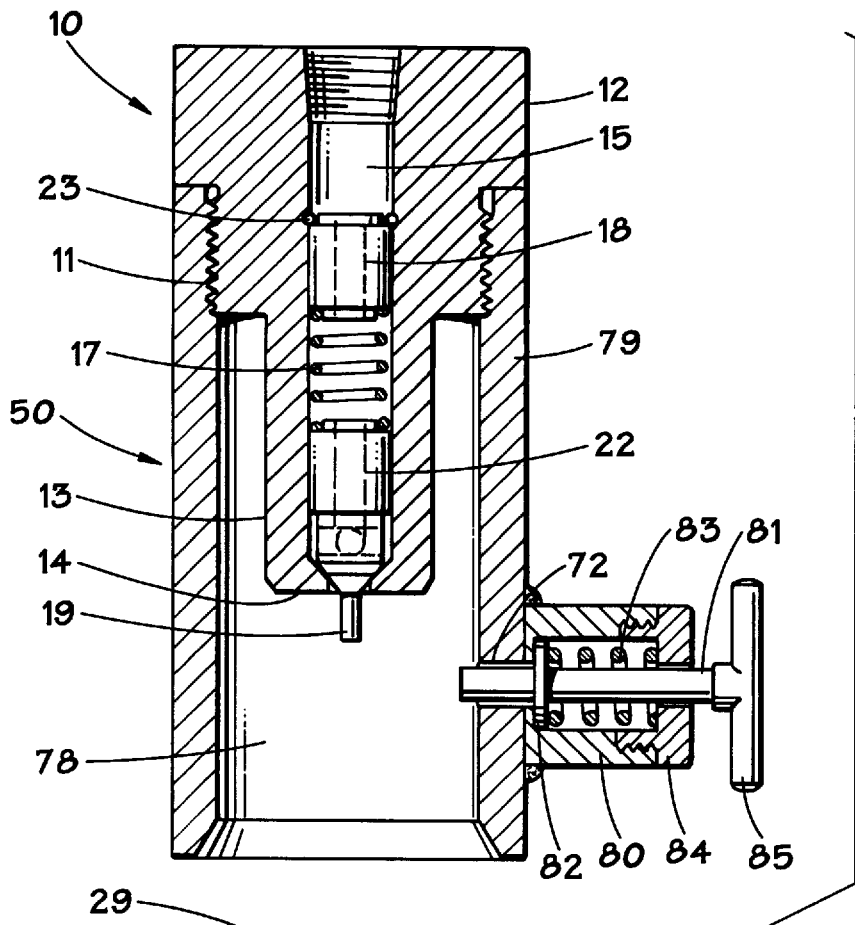
FIG. 2 is a cross section view of the male and female coupling members before they are connected.
Figure 2:
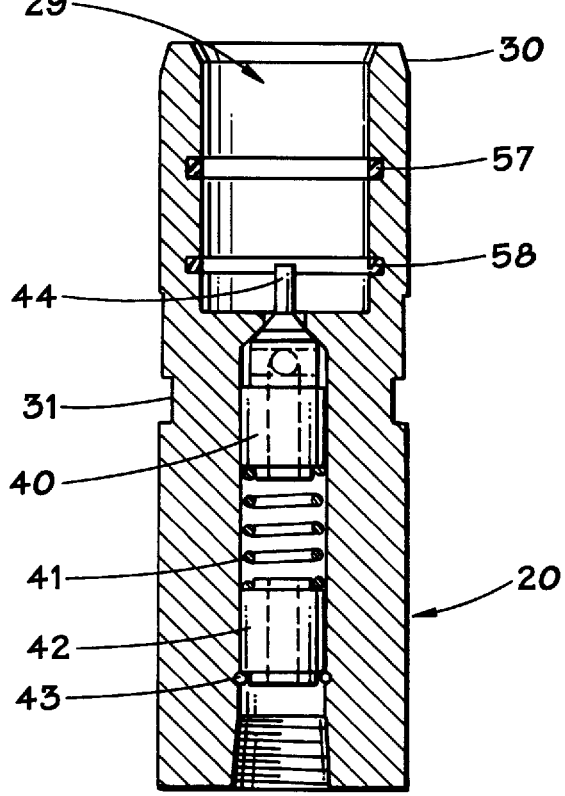

In FIG. 2, male member (10) is shown with sleeve (50) engaged thereto with the use of threads (11). Also shown is female member (20) before the male and female coupling members are connected. Lock pin (81) extends through aperture (72) in the sleeve body (79). The lock pin is urged through the aperture by spring (83) bearing on flange (82) attached to the lock pin.

The female member (20) has an internal bore (29) and a poppet valve (40) for controlling fluid flow through the bore. Poppet valve (40) is urged into the normally closed position by valve spring (41) which is in contact with spring collar (42) and held in the bore by lock ring (43). The bore of the female member may have one or more seals (57), (58) for sealing engagement with probe (13) of the male member. When the male and female members are fully engaged, valve actuator (44) on poppet valve (40) contacts valve actuator (19) on poppet valve (22) to urge the poppet valves open and establish flow of hydraulic fluid between the members.

Figure 3:
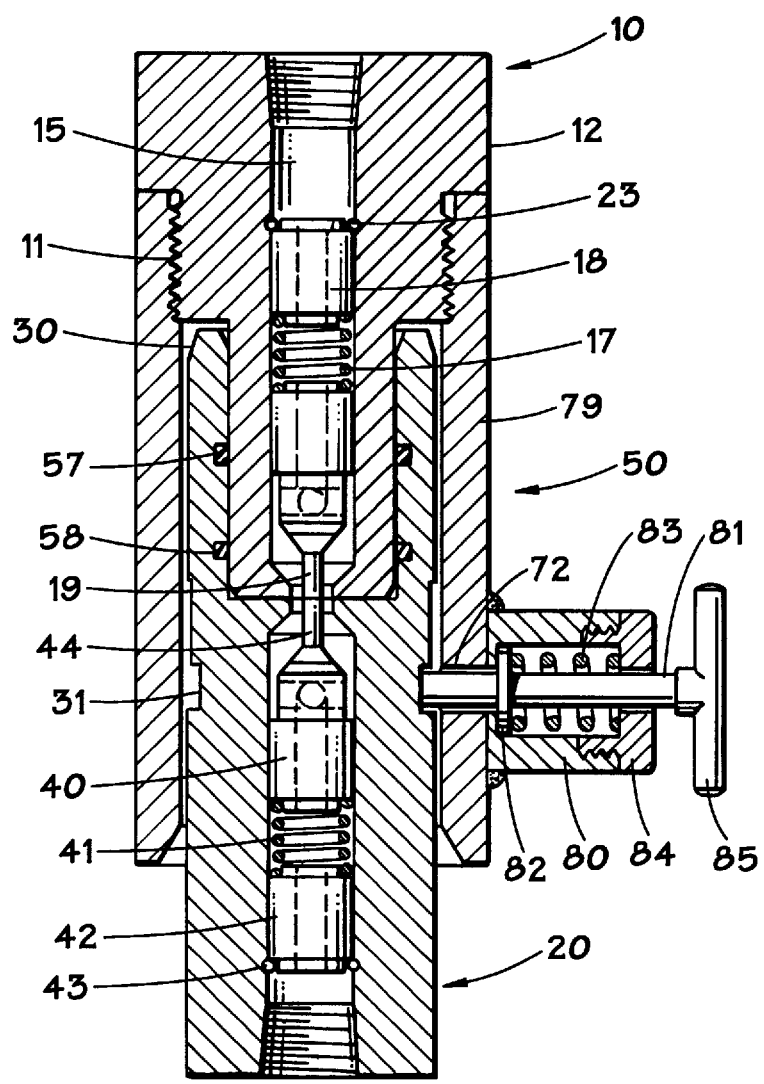
FIG. 3 is a cross section view of the connected male and female coupling members with the locking mechanism engaged.

In FIG. 3, the male and female members are shown fully connected while lock pin (81) is engaged in groove (31) in the female member body. At this time, the valve actuators (44, 19) are mutually engaged and hydraulic fluid flow is established between the male and female coupling members. To release the male and female coupling members, handle (85) may be retracted by remote means such as robotics to disengage lock pin (81) from groove (31) in the female member body.

Figure 4:
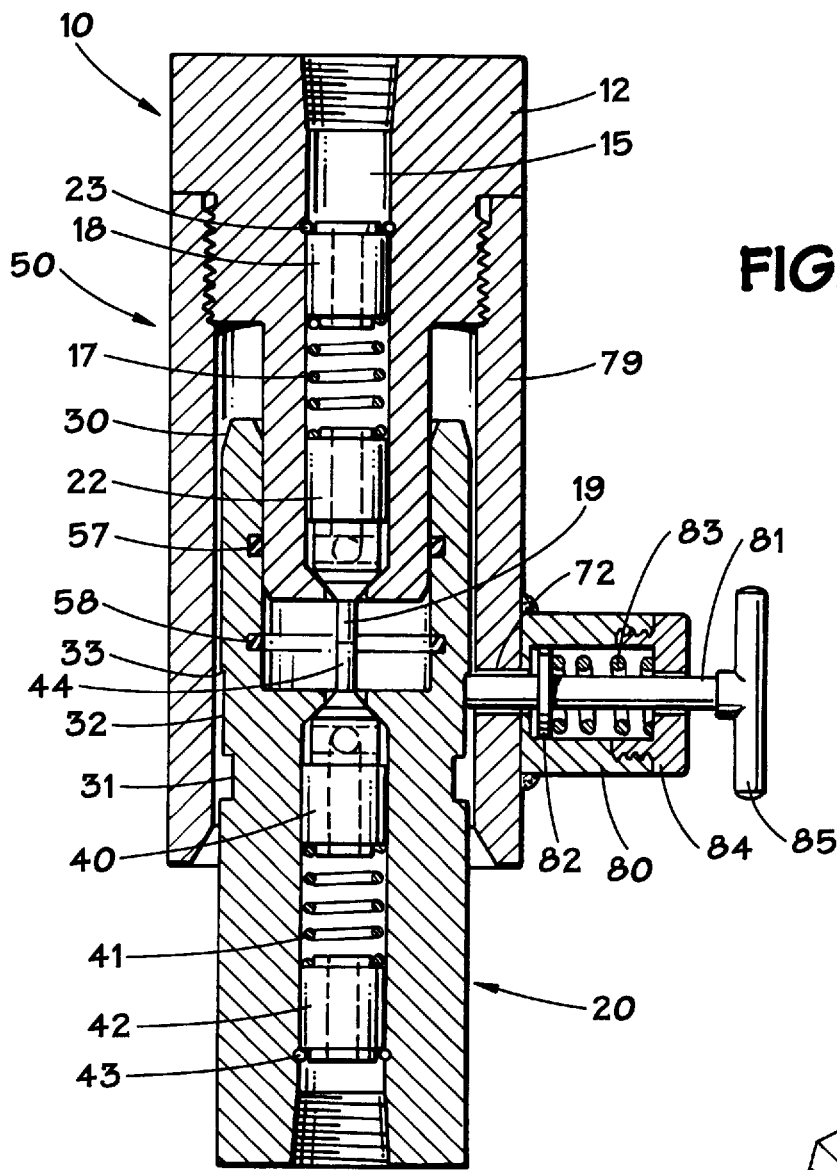
FIG. 4 is a cross section view of the male and female coupling members with the locking mechanism engaged after partial separation of the members.
Figure 5:
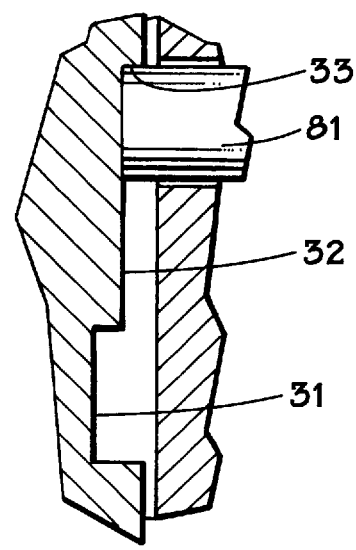
FIG. 5 is an expanded cross section view of the two circumferential grooves around the female member of FIG. 4.

In the embodiment of FIG. 4, the female member body includes a second groove (32) which is shallower than groove (31). By pulling the lock pin (81) out of the deeper groove (31), the female member may be partially disconnected from the male member, yet held temporarily in place by engagement of the lock pin (81) with groove (32). Shoulder (33) has sufficient depth to prevent complete disconnection of the male and female members. When the lock pin is in groove (32) abutting shoulder (33), valves (22, 40) in the male and female coupling members are closed to prevent the flow of hydraulic fluid or leakage in the coupling. Also shown in FIG. 5 is an expanded cross section view of the lock pin (81) engaging groove (32) to lock the male and female members together in the temporary "parked" position while the valves in each of those members are closed.

The female member has an angled leading face to help urge the lock pin out so that the female coupling member can fully enter the sleeve (50). The lead angle (30) on the female member should be sufficient such that the lock pin is urged radially outwardly to compress spring (83) until the female member is fully inserted and the lock pin engages groove (31) which extends circumferentially around the female member body. Lead angle (30) on the face of the female member will facilitate insertion of the female member into the sleeve past the lock pin (81).

Although the groove in the female member body may only extend partially around the female member, it is preferably around the entire female circumference so orientation between the male and female members is not necessary. By robotics or remote activation, the female member is pushed into the sleeve fully and the lock pin engages the groove in the female member.

The two stage lock groove used in the female member allows the members to be locked together even after the flow of hydraulic fluid ceases. By partial release of the lock pin, the female member is allowed to partially separate from the male member. Internal line pressure will cause the female member and male member to separate until the lock pin abuts shoulder (33) which prevents the male and female coupling members from being separated any further. When the lock pin is in the second groove, the poppet valves are closed, thus preventing further high separational forces between the members. The female coupling member can now be "parked" at this position while still locked to the male member. By fully disengaging the lock pin, the male and female coupling members may be fully disconnected.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling comprising:
   (a) a male member having a body and an internal bore extending therethrough and a poppet valve in the bore slidable between an open and a closed position;
   (b) a female member having an internal bore extending from a first end to a second end thereof, a poppet valve in the bore slidable between an open and a closed position and a receiving chamber for receiving the male member therein, the female member body having a first circumferential groove and a second circumferential groove;

(c) a sleeve attached to the male member having an axis and an internal bore sufficient to insert the female member body therethrough; the sleeve having an aperture;

(d) a retractable lock pin positioned perpendicular to the sleeve axis and extending through the aperture, the lock pin engageable with the first circumferential groove to lock the female member to the male member when the female member is fully inserted through the sleeve bore and both of the poppet valves are in the open position, the lock pin engageable with the second circumferential groove to lock the female member to the male member when the female member is partially inserted through the sleeve bore and both of the poppet valves are in the closed position.

2. The undersea hydraulic coupling of claim 1 further comprising a housing attached to the sleeve, the lock pin inserted through the housing, and a spring in the sleeve urging the lock pin through the aperture and against the female member body.

3. The undersea hydraulic coupling of claim 1 wherein the first end of the female member body has a tapered leading face.

4. A locking device for locking together first and second members of an undersea hydraulic coupling comprising:

(a) a sleeve extending axially from the first member and having an aperture therethrough;

(b) a housing attached to the sleeve over the aperture;

(c) a lock pin having first and second ends, the lock pin inserted through the housing and slidable into an extended position through the aperture in the sleeve;

(d) a spring in the housing biasing the lock pin into the extended position; and (e) a first groove and a second groove in the second member, each of the grooves engageable with the first end of the lock pin when the lock pin is in the extended position wherein the first and second members each have normally closed poppet valves, the poppet valves being open when the first end of the lock pin is in the first groove and closed when the first end of the lock pin is in the second groove.

5. The locking device of claim 4 wherein each of the grooves encircles the circumference of the second member.

6. The locking device of claim 4 wherein the sleeve is threaded to the first member.

7. An undersea hydraulic coupling comprising:

(a) first and second coupling members each having an internal bore and a poppet valve in the bore for controlling fluid flow therethrough, the poppet valves biased to the closed position and having mutually engageable valve actuators for urging each of the poppet valves open;

(b) a pair of circumferential grooves around the second member;

(c) a locking pin slidably attached to the first member and being slidable from a locked to an unlocked position on an axis perpendicular to the internal bores of the first and second members to engage the pair of circumferential grooves; the locking pin engaging the first circumferential groove to lock the first and second members together when the poppet valves are open, and engaging the second circumferential groove to lock the first and second members together when the poppet valves are closed.

8. The undersea hydraulic coupling of claim 7 further comprising a spring to bias the locking pin to the locked position.

9. The undersea hydraulic coupling of claim 7 further comprising a sleeve extending axially from the first coupling member, an aperture in the sleeve, and a housing attached to the first coupling member over the aperture, the locking pin slidable within the housing and through the aperture.

10. The undersea hydraulic coupling of claim 9 wherein the sleeve is threaded to the first coupling member.

11. The undersea hydraulic coupling member of claim 8 wherein the locking pin has a flange thereon bearing on the spring.

* * * * *